United States Patent [19]

Hastings

[11] Patent Number: 5,134,355
[45] Date of Patent: Jul. 28, 1992

[54] POWER FACTOR CORRECTION CONTROL FOR SWITCH-MODE POWER CONVERTERS

[75] Inventor: Roy Alan Hastings, Richardson, Tex.

[73] Assignee: Texas Instruments Incorporated, Dallas, Tex.

[21] Appl. No.: 741,973

[22] Filed: Aug. 6, 1991

Related U.S. Application Data

[63] Continuation of Ser. No. 636,649, Dec. 31, 1990, abandoned.

[51] Int. Cl.⁵ .................................................. G05F 1/70
[52] U.S. Cl. ...................................... 323/211; 323/222
[58] Field of Search ............... 323/205, 207, 211, 222, 323/283

[56] References Cited

U.S. PATENT DOCUMENTS

| | | | |
|---|---|---|---|
| 4,437,146 | 3/1984 | Carpenter | 323/222 |
| 4,549,254 | 10/1985 | Kissel | 323/224 |
| 4,651,265 | 3/1987 | Stacey et al. | 323/210 |
| 4,677,366 | 6/1987 | Wilkinson et al. | 323/222 |
| 4,683,529 | 7/1987 | Bucher | 323/207 |
| 4,729,088 | 3/1988 | Wong | 323/224 |
| 4,736,151 | 4/1988 | Dishner | 323/224 |
| 4,761,725 | 8/1988 | Henze | 323/283 |
| 4,827,151 | 5/1989 | Okado | 323/222 |
| 4,837,495 | 6/1989 | Zansky | 323/222 |
| 4,942,509 | 7/1990 | Shires et al. | 323/222 |
| 4,974,141 | 11/1990 | Severinsky et al. | 323/224 |
| 5,003,454 | 3/1991 | Bruning | 323/222 |

OTHER PUBLICATIONS

Spangler, "A Power Factor Corrected, MOSFET Multiple Output, Flyback Switching Supply", PCI, Oct. 1985 Proceedings, pp. 19-32.
Barabas, "Simplified Control Algorithm for Active Power Factor Correction", PCI, Oct. 1985 Proceedings, pp. 1-9.
Hadley, "Power Factor Correction Using a Preregulating Boost Converter", PCI, Oct. 1988 Proceedings, pp. 94-100.
"Advance Information ML4812 Power Factor Controller", Micro Linear, Jun. 1989.
Sum, "Power Factor and its Effect on Power Quality", Power Conversion, Oct. 1989, Proceedings, pp. 74-87.
Nalbant and Klein, "Design of a 1 KW Power Factor Correction Circuit", Power Conversion, Oct. 1989, Proceedings, pp. 121-134.
Mammano and Neidorff, "Improving Input Power Factor-a New Active Controller Simplifies the Task", Power Conversion, Oct. 1989, Proceedings, pp. 100-109.
Neufield, "Control IC for Near Unity Power Factor in SMPS", Power Conversion, Oct. 1989, Proceedings, pp. 110-119.
Herfurth, "Application Note: TDA 4814-Integrated Circuit for Sinusoidal Line Current Consumption", Siemens Components Mar., 1986, pp. 103-107.
Dixon, "High Power Factor Preregulators for Off-Line Power Supplies", High Power Factor Preregulators, Unitrode Corporation, Dec. 1990.
Chambers and Wang, "Dynamic Power Factor Correction in Capacitor Input Off Line Converters", Sorensen Company, Manchester, N.H., Dec. 1990.

Primary Examiner—Jeffrey Sterrett
Attorney, Agent, or Firm—B. Peter Barndt; Richard Donaldson; William E. Hiller

[57] ABSTRACT

A PFC controller (FIG. 5) provides power factor correction and peak current limiting for a switch-mode power converter of any topology (buck, boost or buck-boost), without having to directly sense inductor current. The PFC control technique involves using a piecewise-polynomial analog computer (AC) to compute power transistor on-times in accordance with separate polynomial transfer functions for power-factor control and peak-current-linking using as inputs current representations of line input voltage (VLN), load output voltage (VLD), and long-term current demand (VCD). A conduction cycle is initiated by sensing when the rate of change in the inductor current reaches zero using an auxiliary winding on the current storage inductor (Wzd), and terminated after the computed on-time to implement either power-factor control or peak-current-limiting.

46 Claims, 5 Drawing Sheets

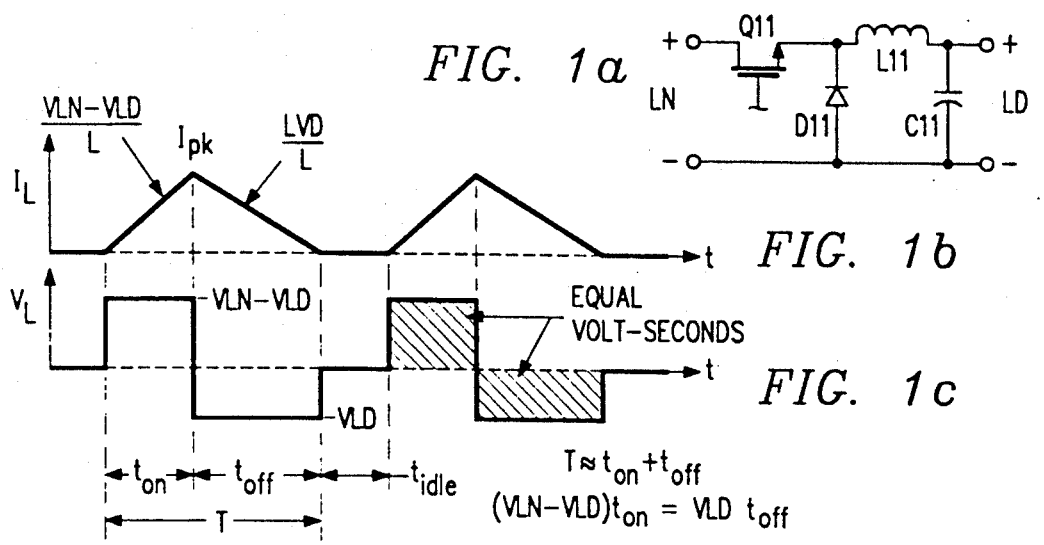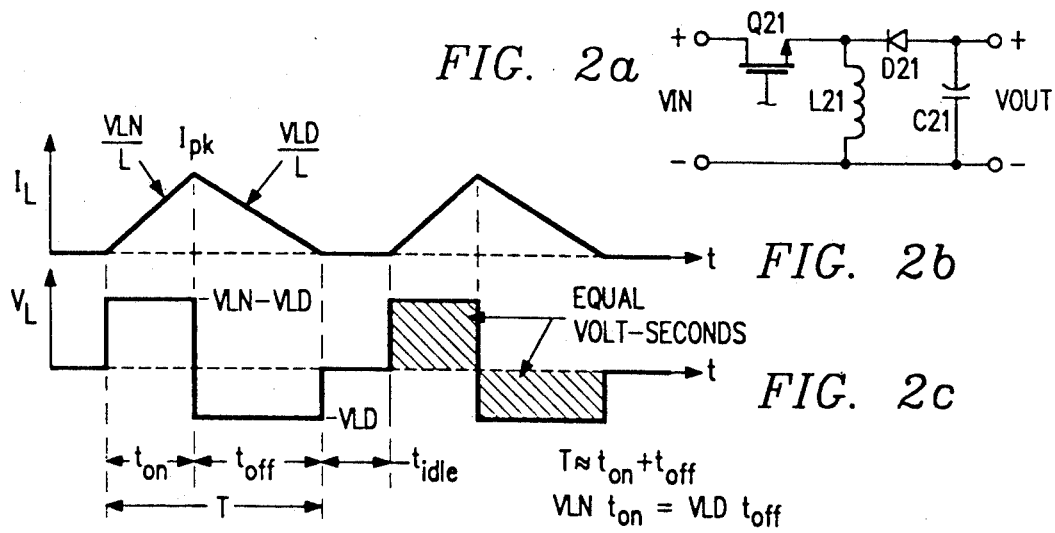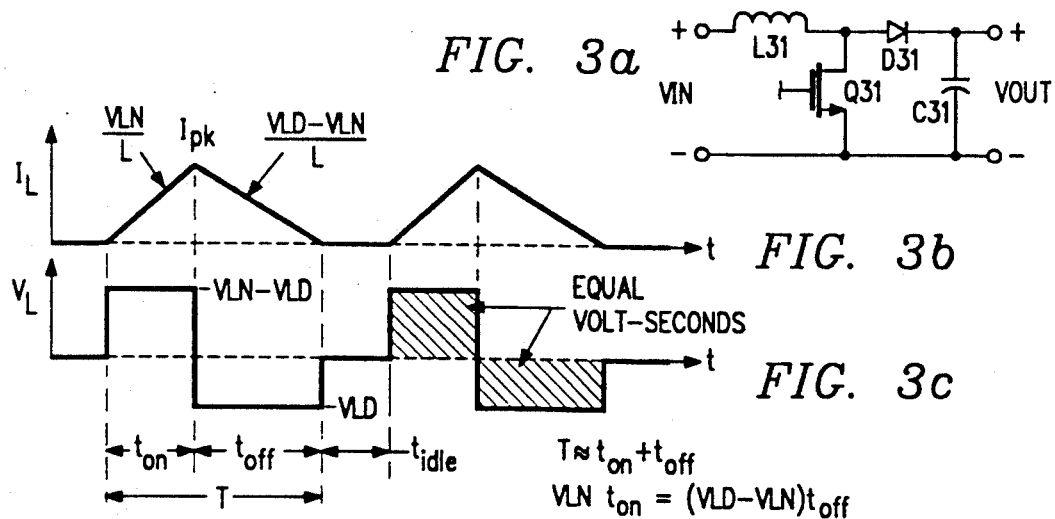

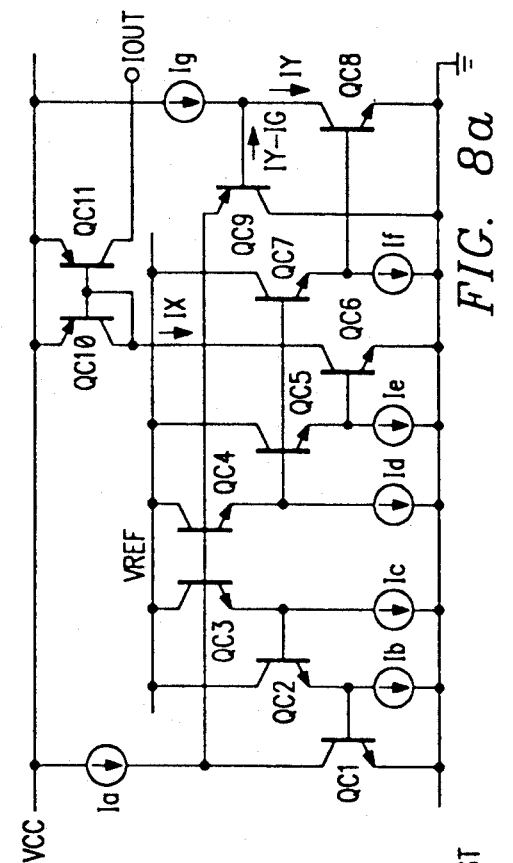
FIG. 8a
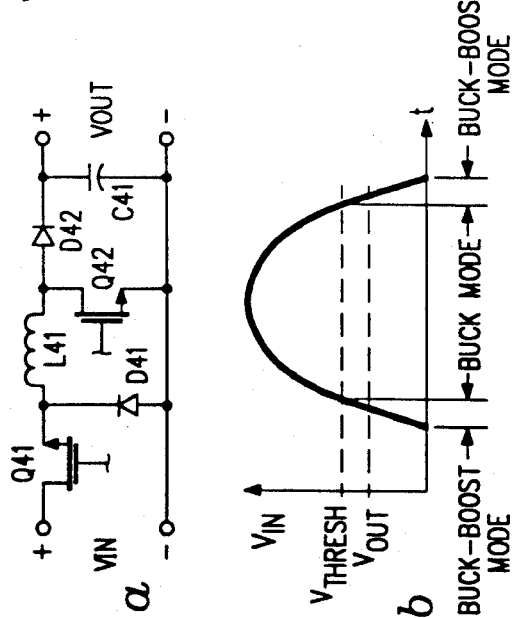
FIG. 4a
FIG. 4b
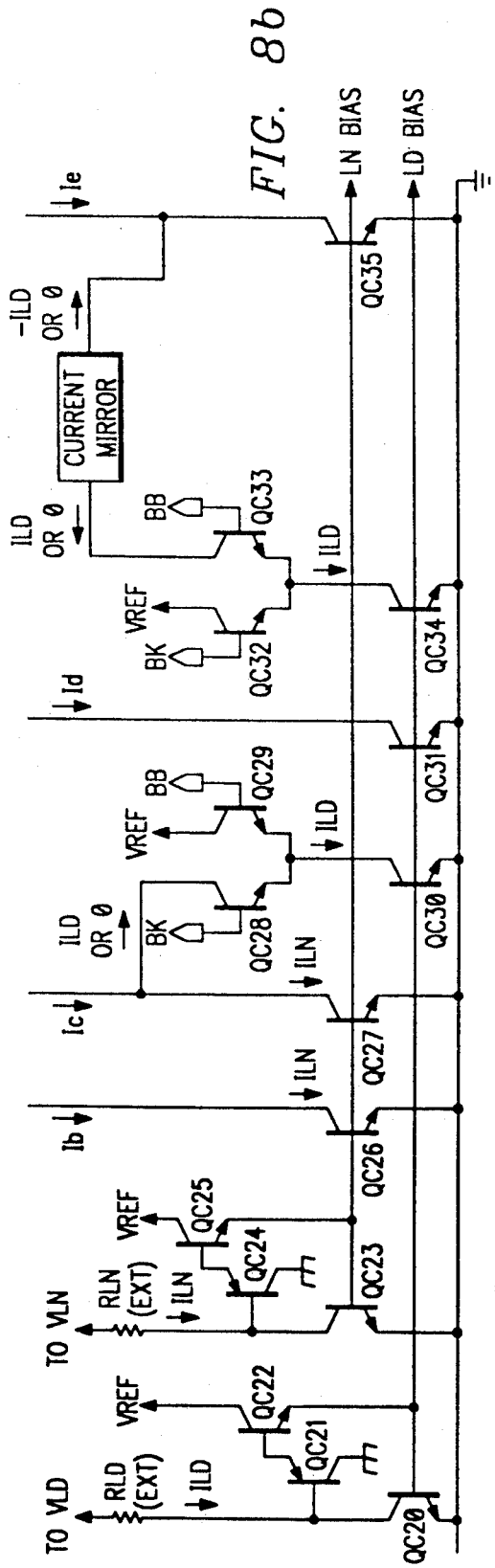
FIG. 8b

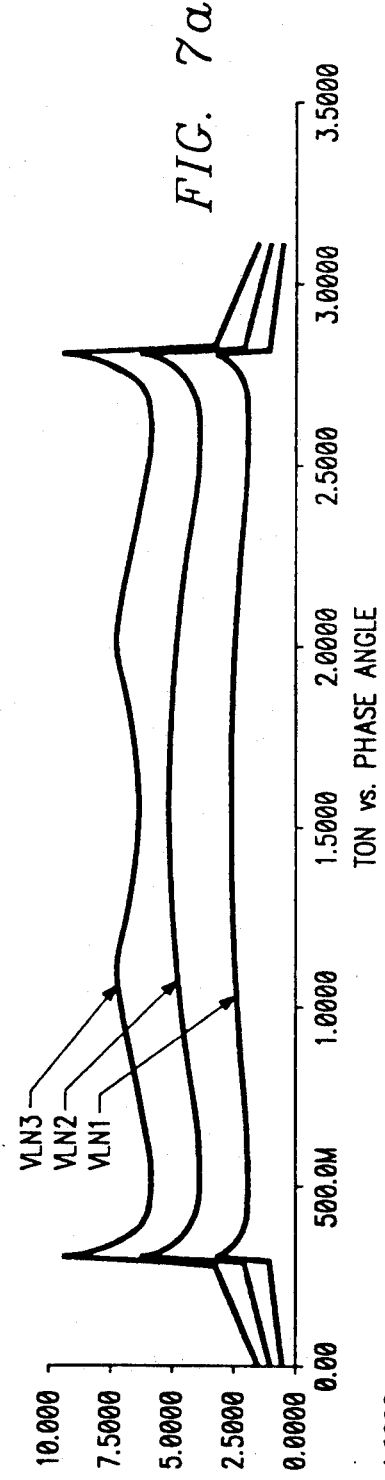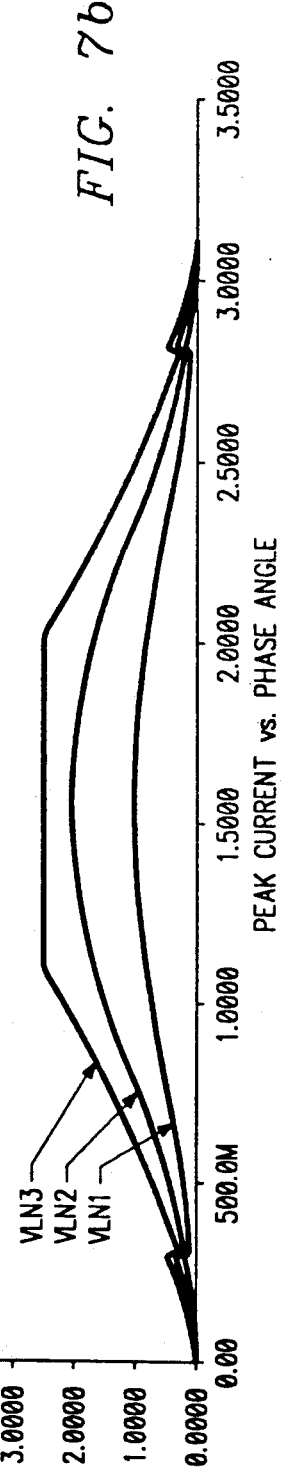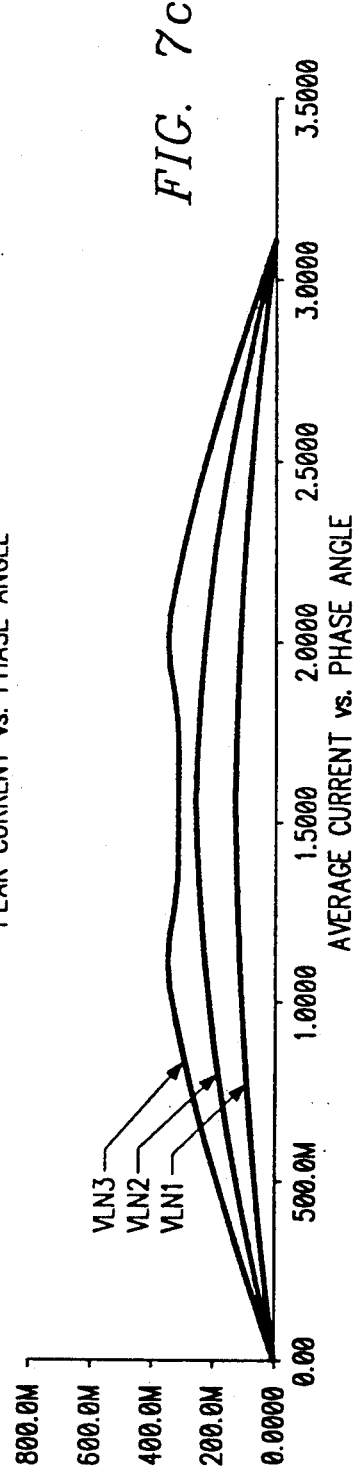

POWER FACTOR CORRECTION CONTROL FOR SWITCH-MODE POWER CONVERTERS

This application is a continuation of application Ser. No. 07/636,649, filed Dec. 31, 1990 now abandoned.

TECHNICAL FIELD OF THE INVENTION

The invention relates to switch-mode power converters that include power factor correction, and more particularly relates to a power factor correction controller and method for power factor correction circuits.

In even greater particularity, the invention relates to a power factor correction control technique that operates the power converter in near-continuous mode, and implements power factor correction using computational techniques to control switch on-time for optimum current shaping and pulse-by-pulse current limiting. The power factor correction technique may be used with various conventional power converter topologies including buck, boost, buck-boost, and combinations such as buck and buck-boost.

RELATED APPLICATION

This Application incorporates by reference the disclosure in related to co-pending U.S. patent application Ser. No. 638,264, titled "Piecewise-Polynomial Function Generation Using Interdependent Translinear Circuits", filed Dec. 31, 1990, which is assigned to the Assignee of this invention, Texas Instruments, Incorporated.

BACKGROUND OF THE INVENTION

Solid state power factor correction controllers provide power factor correction for switch-mode power converters. Interest in these circuits has surged as a result of a significant increase in the use of switch-mode power converters in such products as computers and electronic lamp ballasts.

The specific problem to which the invention is applicable is the design of a solid-state power factor correction controller that does not require directly sensing the current through the current storage inductor in the switch-mode power converter, while still incorporating pulse-by-pulse current limiting. An advantageous design would be adaptable to multiple converter topologies.

Conventional switch-mode power converters include a bridge rectifier and a large electrolytic capacitor at the input. The converter draws current from the AC line only when the line voltage exceeds the voltage across the capacitor, resulting in sharp current spikes at the peaks of the voltage sinusoid. This current waveform has a very large harmonic content, and harmonic currents perform no useful work.

Power factor for switch-mode converters is defined as the ratio of fundamental in-phase power to total power, a definition that encompasses harmonic currents. Using this definition, a typical converter will have a power factor of 0.7 or less.

This low power factor is undesirable for several reasons. First, the low power factor limits the amount of power which can be extracted from a given circuit. Second, the third harmonic current is summed across the phases of a three-phase circuit, producing a net current flow in the neutral line which in most building distribution circuits is not sized to carry large currents, and thus it may easily be overloaded. Third, although the higher harmonics are largely blocked by power transformers, they may couple through the building distribution circuits, producing EMI (electromagnetic interference) from power lines.

As a result, demand has been increasing in both industry and government circles that switch-mode power converters be power factor corrected. Moreover, while commercial environments are most immediately affected by the power factor problems associated with switch-mode power conversion, extending government requirements for power factor correction to consumer products is expected.

The most practical approach to solid-state power factor correction is to combine a standard switch-mode power conversion topology with a specially designed controller to regulate the switching of the power converter. Basically, these power factor correction (PFC) controllers implement power factor correction by drawing current from the AC line in phase with the line voltage, thereby yielding a reduction in harmonics and EMI. Power factor correction does not replace switch-mode power conversion, but rather, act as a preregulator that takes power from the AC line and provides an unregulated DC source for the switch-mode power converter that follows.

Solid-state PFC controllers have been designed for each of the principal switch-mode power converter topologies: buck, boost, and buck-boost. In general, buck-derived circuits, including buck-boost circuits, interrupt the line input current, while boost-derived circuits do not.

Each of these power converter topologies is described in Section 1.1 of the Detailed Description. Basically, each includes (a) a current storage inductor, and (b) a power switching transistor that controls the current through the inductor and is controlled by the PFC controller to provide power-factor-corrected conversion.

Although buck and buck-boost power converters have their advantages, to date most solid-state PFC controllers have been built around boost-derived power converters. Boost topologies do not interrupt line current, making it easier to block high frequency currents from the AC line (i.e., less robust and expensive filtering is required). Typically, these controllers use current shaping techniques that attempt to ensure that line current is drawn in-phase with the line voltage.

Examples of these PFC controllers are the Micro-Linear ML4812, the Siemens TDA4814A, and the Unitrode UC1854. The Micro-Linear and Siemens controllers are designed for boost-derived topologies, while the Unitrode controller can be used with any topology.

All of these PFC controllers use current-mode control with inner and outer coupled feedback loops. When the power transistor is turned on, inductor current increases linearly. When the current reaches some specific threshold, as sensed by the inner control loop, the power transistor is turned off. The current threshold is itself controlled by a second, outer control loop which senses the load voltage, and therefore, current (i.e., power) demand. If the load voltage is low, the outer control loop raises the current threshold of the inner control loop so as to pump more current into the bulk storage capacitor. Conversely, if the load voltage is high, the outer control loop lowers the current threshold of the inner loop.

Current-mode control can be easily extended to give power factor correction. In a continuous-mode converter, the current threshold of the inner loop directly controls average inductor current, and thus average line current for a boost-mode topology. Thus, all that is necessary is to ensure that the current control signal provided to the inner control loop is proportional to the line voltage. By forcing peak inductor current to follow a sinusoidal envelope, the average line current can be shaped into a sine wave.

A number of controller designs have been used to implement current-mode control. The Micro-linear PFC controller implements continuous mode operations, ensuring that the current control signal provided by the inner control loop is proportional to the line voltage using a multiplier between the inner and outer control loop—one input to the multiplier is a current demand signal calculated by the outer control loop, and the other input is the line rectified waveform. The Siemens PFC controller implements nearly continuous mode operations, using an auxiliary winding on the current storage inductor to indirectly sense inductor current —this sense winding is monitored, and the power transistor is turned on when inductor current falls to zero.

The Unitrode PFC controller is a versatile design that can be used to control both boost- and buck-derived topologies. This controller relies upon directly sensing average inductor current rather than peak inductor current—a small sensing resistor produces a voltage proportional to line current, and this sensing voltage is fed to a current error amplifier where it is compared to a current demand signal generated by an outer control loop (a feedback network around the current error amplifier acts as a low-pass filter, thus ensuring that the demand signal controls average line current rather than peak line current). If the current error amplifier sees that the demand signal is larger than the filtered line current, its output voltage increases, thereby increasing the conduction time of the power transistor.

To provide the current demand signal, the outer control loop implements a line voltage feed forward technique that makes the controller much more insensitive to line voltage fluctuations. The current demand signal is the product of the average load current demand (from the voltage error amplifier), the instantaneous line voltage, and the reciprocal of the square of the average line voltage. This function will appear to be proportional to line voltage at 60 Hz while for lower frequencies, this function will appear to be inversely proportional to line voltage due to the average line voltage term. Thus, the circuit will power factor correct the 60 Hz AC sinusoid, but for lower-frequency variations in line voltage, the circuit will behave as a normal converter and will not be so prone to over-reacting to line voltage fluctuations.

The currently available PFC controller designs for boost topologies are disadvantageous in several respects. A boost circuit must always step up the load voltage, and for many applications this leads to high load voltages (500 V or more), and often to uneconomic solutions and the possibility of safety hazards. Second, boost converters are subject to very high inrush currents when they are started, which can overstress components and are difficult to suppress without complicated circuitry. Third, currently available PFC controllers for boost converters, including the Unitrode controller that can be used with other topologies, require direct sensing of inductor currents using either small-value sensing resistors (which introduce noise) or current sense transformers (which are relatively expensive).

Accordingly, a need exists for a power factor correction controller for switch-mode power converters that is adaptable to multiple converter topologies, and in particular to buck and buck-boost topologies which permit a step-down in voltage, but that does not require sensing the current through the current storage inductor.

SUMMARY OF THE INVENTION

The invention is a power factor correction (PFC) controller for switch-mode power converters that uses computational techniques to effect line current shaping for the purpose of power factor correction without having to sense current through the current storage inductor. The PFC controller is adaptable to any of the common power converter topologies, and in particular, to multiple power transistor topologies, such as a combined buck and buck-boost topology.

In one aspect of the invention, the PFC control technique provides power factor correction for a switch-mode power converter that includes a current storage inductor and at least one power switching component, and that receives a line voltage waveform and, in successive conduction cycles, line current, thereby providing a converted load voltage.

Each conduction cycle of the power converter is begun by activating the power switching component to cause an increase in current through the current storage inductor. The resulting line voltage VLN and load voltage VLD are detected, and corresponding VLN and VLD representations are generated. In addition, a load current demand representation ICD corresponding to the load demand for current is determined.

The desired on-time period for activating the power switching component is computed in accordance with the relationship between the average current through the current storage inductor and the known representations for VLN, VLD, and VCD, such that the operation of the power converter is power factor corrected. At the end of the computed on-time, the power switching component is deactivated to terminate the conduction cycle and allow the current stored in the current storage inductor to decay.

When the current IL through the current storage inductor has dropped to about equal to a reference inductor current IL(ref), the power switching component is activated to begin the next conduction cycle.

In more specific aspects of the invention, the PFC control technique also effects peak current limiting without having to directly sense inductor current. The desired on-time period for activating the power switching component for current-limiting is computed in accordance with the relationship between the peak current through the current storage inductor and the known representations for VLN and VLD (i.e., independent of the current demand representation VCD), such that the operation of the power converter is peak-current limited.

The computations of the on-time periods for both power-factor control and peak current-limit control are accomplished by piecewise-polynomial function generation, which implements a piecewise-polynomial transfer function comprising separate power-factor control and peak current-limit control transfer function segments. The breakpoint between the transfer function segments establishes the breakpoint between power-factor control operations and peak-current limiting operations of the PFC controller.

For the exemplary PFC controller technique, the power switching component is implemented by a two-transistor power converter topology that operates in buck mode for line input voltages above a selected threshold, and in buck-boost mode for line input voltages below that threshold. The reference inductor current IL(ref) used to control activation of the power switching transistors is zero current, which is detected by a zero current detection winding on the inductor, i.e., dIL/dt equal to zero. A hiccup timer controls activation time when the inductor voltage is so low that dIL/dt is difficult to accurately detect.

The technical advantages of the invention include the following. The PFC control technique computes the necessary on-times and off-times for the power transistor(s) to implement both normal power-factor control operations and, when current demand exceeds a design maximum, peak current-limit operations. A piecewise-polynomial function generation technique is used to provide the necessary computations for implementing a piecewise-polynomial transfer function that includes separate power-factor control and peak current-limiting control transfer function segments. This computational technique relies on sensing line input and load output voltage (and determining current demand from the sensed load voltage) rather than inductor current, thereby obviating the need for directly sensing the inductor current.

The PFC control function can be implemented for various power converter topologies, including switching between combination topologies (such as buck and buckboost) while maintaining output regulation and input power factor correction. The PFC controller is immune to inductor dry-out, and has no inherent minimum load requirement. High noise immunity results from the lack of direct current sensing. Input voltage feed forward can be used to make the controller relatively insensitive to line voltage fluctuations.

BRIEF DESCRIPTION OF THE DRAWINGS

For a more complete understanding of the invention, and for further features and advantages, reference is now made to the following Detailed Description of an exemplary embodiment of the invention, taken in conjunction with the accompanying Drawings, in which:

FIGS. 1a-1c, 2a-2c, and 3a-3c respectively illustrate circuit topologies and associated waveforms for buck, buck-boost, and boost switch-mode power converters;

FIG. 4a-4b respectively illustrate a two-transistor buck/buck-boost power converter topology, and the combined buck and buck-boost operation for that topology as implemented by the exemplary PFC controller;

FIGS. 7a-7c are representative waveforms illustrating combined buck and buck-boost mode operations, with peak current limiting; and FIGS. 8a-8b respectively are simplified and more detailed schematics for the analog computer and limiter section of the controller.

DETAILED DESCRIPTION OF THE INVENTION

Figure 5:
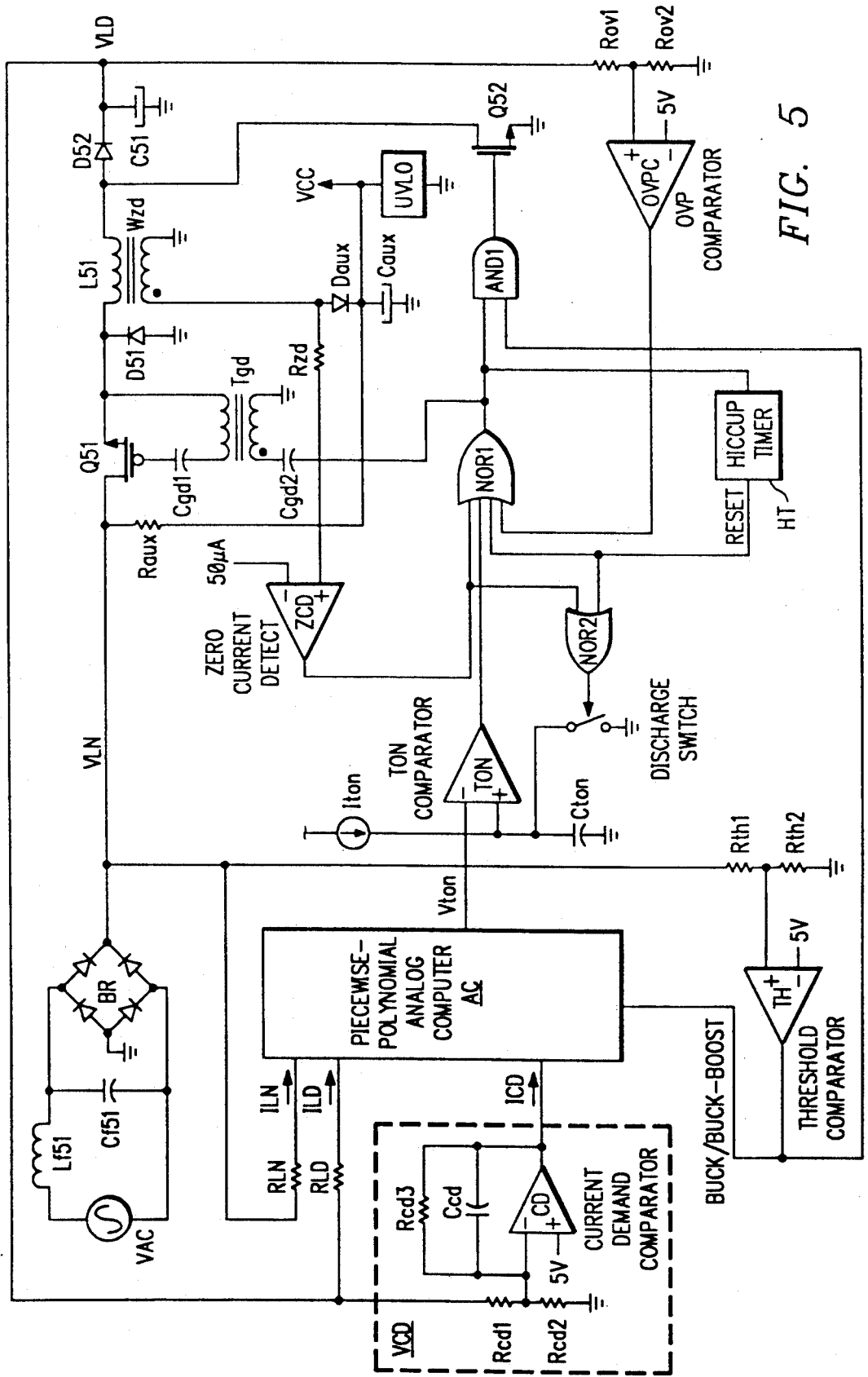
FIG. 5 is a simplified schematic of the PFC controller and the associated buck/buck-boost power converter.

The Detailed Description of the exemplary embodiment of the power factor correction (PFC) controller is organized as follows:

| | | |
|---|---|---|
| 1. | PFC Computational Technique | |
| | 1.1. Power Converter Topologies | |
| | 1.2. PFC Control Equations | |
| | | 1.2.1. Power-Factor Equations |
| | | 1.2.2. Current-Limit Equations |
| 2. | PFC Controller | |
| | 2.1. Buck/Buck-Boost Topology | |
| | 2.2. Power Conversion | |
| | 2.3. On-Time Control | |
| | | 2.3.1. Zero Current Detection |
| | | 2.3.2. Power Transistor Switching |
| | | 2.3.3. Ton Computation |
| | 2.4. Mode Selection | |
| | 2.5. Piecewise-Polynomial Analog Computer | |
| | | 2.5.1. Power-Factor Control |
| | | 2.5.2. Current-Limit Control |
| | | 2.5.3. Breakpoint Voltage Clamping |
| 3. | Exemplary Applications | |
| 4. | Conclusion | |

For the exemplary embodiment, the PFC control technique is implemented for a two-transistor switch-mode power conversion topology using buck and buck-boost modes of operation. The PFC control technique has general applicability to other power conversion topologies.

The exemplary PFC controller performs power-factor control and peak current-limiting control computations using a piecewise-polynomial analog computer based on the piecewise-polynomial function generator described in the Related Application, the disclosure of which is incorporated by reference.

1. PFC Computational Technique. The PFC control technique relies on current shaping to achieve power factor correction of the switch-mode power conversion operation. The power converter uses one or more power transistors, whose on-times and off-times are controlled by the PFC controller in an attempt to meet two opposing demands.

The first demand is that the current waveform be a 60 Hz sinusoid that is in-phase with the voltage waveform imposed across the input of the circuit. The second demand is that the circuit adjust the long term average current drawn from the line in such a manner that the output voltage remains roughly constant.

Assuming that the inductor current is discontinuous (i.e., it falls to zero at the beginning of each conduction cycle for the power transistors), then there is an analytic relationship between the on-times and off-times of the power transistors and the average inductor current that allows those on-times and off-times to be computed. Discontinuous operation is required to establish a reference for on-time computations—the exemplary PFC control technique is designated as nearly continuous because the duration of the period in which inductor current is zero is kept at a minimum (thereby minimizing peak currents). An alternative continuous implementation could be used if a reference inductor current is otherwise established.

The PFC control computations require as inputs only the line input and load output instantaneous voltages, which can be sensed, and a voltage that represents long-term average output current, which can be developed by integrating over time load output voltage. Simultaneously, the peak inductor current can be computed from these same variables.

Thus, with the PFC control technique, there is no need to sense either peak or average inductor current. Rather, power transistor on-times to achieve both power factor control and peak current limiting can be computed entirely from external variables.

Thus, the PFC control technique: (a) Operates the converter in near-continuous mode by use of zero-current detection circuitry; (b) Ensures power factor correction by on-time control, using as input variables the instantaneous input and output voltages, and a current demand voltage derived from the difference between long-term output voltage and a voltage reference; (d) Achieves current shaping by computational techniques which do not involve current sensing; and (e) Ensures pulse-by-pulse current limiting by the same on-time control scheme as controls average input current.

1.1. Power Converter Topologies. FIGS. 1a, 2a, and 3a illustrate the standard switch-mode power converter topologies: buck, buck-boost, and boost. Each includes a respective power switching transistor Q11, Q21, and Q31, and a respective current storage inductor L11, L21, and L31, together with a respective diode D11, D21, and D31.

These power conversion components are coupled between the input AC voltage VLN and a respective bulk storage capacitor C11, C21, and C31. The converted load output voltage VLD appears across the bulk storage capacitor.

FIGS. 1b-1c, 2b-2c, and 3b-3c respectively provide illustrative waveforms for inductor current and inductor voltage for each of the topologies. In particular, the inductor current waveforms are triangular in shape because inductor permeability is assumed to be constant.

For each topology, these waveforms illustrate the relationships between the on- and off-times ton and toff, and the line input and load output voltages VLN and VLD, and the peak current Ipk. Note that the period of discontinuity tidle is greatly exaggerated for clarity.

1.2. PFC Control Equations. The exemplary PFC control technique is based on an unambiguous analytic expression for average input current through the power converter in terms of instantaneous line input voltage VLN, instantaneous load output voltage VLD, and a current demand voltage VCD that represents long term average output current demand. Current demand is used rather than power demand because normal power converter operation maintains the load output voltage essentially constant, so that current demand is equivalent to power demand.

In deriving such an analytic relationship for all conventional power-converter operational modes—buck, buck-boost and boost—the following symbolic conventions will be employed:

| | |
|---|---|
| VLN | Instantaneous Line Input Voltage |
| VLD | Instantaneous Load Output Voltage |
| IL | Inductor Current |
| Iin | Instantaneous Input Current |
| Ipk | Peak Inductor Current |
| Iavg | Average Input Current |
| L | Effective Inductance |
| ton | Converter on-time |
| toff | Converter off-time |
| $\tau$ | Converter Period |

($\tau$ = ton + toff)

It is assumed that inductor permeability is substantially constant, and that instantaneous quantities do not change significantly over one cycle of converter operation. Also, it is assumed that idle time is insignificant. Under these assumptions, the inductor current will describe a triangular waveform like those shown in FIGS. 1b, 2b, and 3b.

1.2.1. Power-Factor Equations. Referring the waveforms in FIGS. 1b and 1c for buck mode operation, the relationship between ton and toff is:

$$ton \cdot (VLN - VLD) = toff \cdot VLD$$

Solving for toff, $$toff = \frac{VLN - VLD}{VLD} \cdot ton$$

Rearranging and solving for $\tau$:

$$\tau = ton + toff = \left[1 + \frac{VLN - VLD}{VLD}\right] \cdot ton$$
$$= \frac{VLN}{VLD} \cdot ton$$

The average current Iavg through the input of the converter during period $\tau$ is found by:

$$Iavg = \frac{1}{\tau} \int_\tau Iin \cdot dt = \tfrac{1}{2} Ipk \cdot ton/\tau$$

Substituting in (VLN−VLD)/L·ton for Ipk and using the above equation for $\tau$, the equation for Iavg reduces to:

$$Iavg = \frac{(VLN - VLD) \cdot VLD}{2 \cdot L \cdot VLN} \cdot ton$$

To achieve power factor correction, the Iavg equation must be linearly dependent upon VLN and independent of VLD, and so ton must be of the form:

$$ton = \frac{VLN^2}{(VLN - VLD) \cdot VLD} \cdot VCD \cdot \alpha$$

where VCD is a voltage representing long term current demand, and $\alpha$ is an constant of proportionality (with units of time/ voltage).

Given that ton is of this form, then the average current flowing through the converter is:

$$Iavg = \frac{VCD \cdot \alpha}{2 \cdot L} \cdot VLN$$

Since current is now proportional to voltage by a factor of the form ½VCDα/L, the converter is now power factor corrected, meaning that the input is purely resistive with resistance 2L/VCDα.

Referring to the waveforms in FIGS. 2b and 2c for the buck-boost mode of operation, the relationship between ton and toff is:

$$ton \cdot VLN = toff \cdot VLD$$

Solving for toff:

$$toff = \frac{VLN}{VLD} \cdot ton$$

Since the period $\tau$ is the sum of times ton and toff:

$$\tau = ton + toff = \left[1 + \frac{VLN}{VLD}\right] \cdot ton$$
$$= \frac{VLN + VLD}{VLD} \cdot ton$$

The average current Iavg through the inductor during period $\tau$ is found by:

$$Iavg = \frac{1}{\tau} \int_\tau Iin \cdot dt = \frac{Ipk \cdot ton}{2 \cdot \tau}$$

Substituting in (VLN/L)·ton for Ipk and using the previous expression for $\tau$, this reduces to:

$$Iavg = \frac{VLN \cdot VLD}{2 \cdot L \cdot (VLN + VLD)} \cdot ton$$

To achieve power factor correction, the Iavg equation must be linearly dependent upon VLN and independent of VLD, and so ton must be of the form:

$$ton = \frac{(VLN + VLD)}{VLD} \cdot VCD \cdot \alpha$$

where VCD is a voltage representing long term current demand, and $\alpha$ is an constant of proportionality (with units of time/voltage).

Given that ton is of the form given by the above equation, then the average current flowing through the converter is:

$$Iavg = \frac{VCD \cdot \alpha}{2 \cdot L} \cdot VLN$$

Since current is now proportional to voltage by a factor of ½VCDα/L, the converter is power factor corrected, $$\tau = ton + toff = \left[1 + \frac{VLN}{VLD}\right] \cdot ton$$
$$= \frac{VLN + VLD}{VLD} \cdot ton$$

The average current Iavg through the inductor during period $\tau$ is found by:

$$Iavg = \frac{1}{\tau} \int_\tau Iin \cdot dt = \frac{Ipk \cdot ton}{2 \cdot \tau}$$

Substituting in (VLN/L)·ton for Ipk and using the previous expression for $\tau$, this reduces to:

$$Iavg = \frac{VLN \cdot VLD}{2 \cdot L \cdot (VLN + VLD)} \cdot ton$$

To achieve power factor correction, the Iavg equation must be linearly dependent upon VLN and independent of VLD, and so ton must be of the form:

$$ton = \frac{(VLN + VLD)}{VLD} \cdot VCD \cdot \alpha$$

where VCD is a voltage representing long term current demand, and $\alpha$ is an constant of proportionality (with units of time/voltage).

Given that ton is of the form given by the above equation, then the average current flowing through the converter is:

$$Iavg = \frac{VCD \cdot \alpha}{2 \cdot L} \cdot VLN$$

Since current is now proportional to voltage by a factor of ½VCDα/L, the converter is power factor corrected, meaning that the input is purely resistive, with resistance 2L/VCDα.

Referring to the waveforms in FIGS. 3b and 3c for the boost-mode of operation, the average current is calculable as:

$$Iavg = \frac{1}{\tau} \int_\tau Iin \cdot dt = \tfrac{1}{2} Ipk$$

Substituting in (VLN/L) ton for Ipk:

$$Iavg = \frac{VLN}{2 \cdot L} \cdot VLN$$

To achieve power factor correction, the Iavg equation must be linearly dependent upon VLN and independent of VLD, which is already true of this equation. Assuming that ton = VCDα, where VCDα is the same constant of proportionality as used before:

$$Iavg = \frac{VCD \cdot \alpha}{2 \cdot L} \cdot VLN$$

Since current is now proportional to voltage by a factor of the form ½VCDα/L, the converter is now power factor corrected, meaning that the input is purely resistive with resistance 2L/VCDα.

Note that the analytic expressions for ton were developed in such a way that the resistance of the converter was always the same, regardless of the mode of operation. Thus, a converter using analytic control techniques can be selectively switched between modes of operation at will, without interfering with power factor correction.

1.2.2. Current-Limit Equations. The exemplary PFC control technique also permits the power converter to be current-limited on a pulse-by-pulse basis without current sensing. Here again, peak current limiting relies on the existence of an unambiguous analytic expression relating on-time and peak inductor current in terms of instantaneous line input voltage VLN and instantaneous load output voltage VLD (peak current limiting is independent of current demand).

Accordingly, it is necessary only to limit the on-time in an appropriate manner, and inductor current will also be limited. Such a limiting scheme depends upon the inductor retaining its expected inductance, which is typically a safe assumption (if the inductor shorts out internally, the circuit would fail, but in such a drastic malfunction any electronic protection is of questionable value because it is likely to act too slowly to save the circuit).

To derive the equations for the current limiter, the peak current is first expressed as an equation involving ton, which in buck mode is:

$$Ipk = \frac{(VLN - VLD)}{L} \cdot ton$$

where L is effective inductance.

This equation is solved for ton, assuming that Ipk has reached the value we desire to limit at:

$$ton(\text{limit}) = \frac{1}{VLN - VLD} \cdot L \cdot Ilimit$$

where Ilimit is the peak current limit selected by the circuit designer.

In a similar manner, equations for buck-boost and boost can be derived, which are numerically equivalent:

$$ton(\text{limit}) = \frac{1}{VLN} \cdot L \cdot Ilimit$$

where, again, Ilimit is the peak current limit selected by the circuit designer.

2. PFC Controller. The exemplary PFC controller provides power factor correction for an exemplary switch-mode power converter that has a combined buck and buck-boost topology. The PFC controller corrects the power factor for the power conversion process by controlling the on-times of two power switching transistors to draw line current from the AC line in phase with the line voltage. This current-shaping yields a reduction in harmonics and electromagnetic interference.

The PFC control function performed by the PFC controller actually involves two distinct control functions: power factor correction and peak current limiting. Stated another way, for both the buck and buck-boost power conversion modes, the PFC controller is required to implement two separate transfer functions: (a) a power-factor control function in which power-transistor on-time is controlled in accordance with power demand and power factor correction requirements, and (b) a current-limit control function in which power-transistor on-time is controlled in accordance with peak current limiting requirements (regardless of power demand or power factor correction).

2.1. Buck/Buck-Boost Topology. FIGS. 4a and 4b illustrate the buck/buck-boost power converter topology used in connection with the exemplary PFC controller. In particular, the plot in FIG. 4b illustrates the relationship between the two modes of operation in terms of line input and load output voltages.

Referring to FIG. 4a, the power converter includes power switching transistors Q41 and Q42, and a current storage inductor L41. By holding Q42 off and switching Q41, the converter runs in buck mode. By holding Q41 on and switching Q42, it runs in boost mode. If both switches are pulsed in unison, the converter runs in buck-boost mode.

The buck/buck-boost topology allows the power converter to be operated in buck-mode for most of the input voltage waveform, switching to buck-boost operation only at low line input voltages (relative to load output voltages) to prevent drop out. This combined mode of operation takes advantage of the low voltage stresses and reasonably low current stresses attendant to buck mode operation. In particular, power transistor Q42 can be made relatively small because it is only on for the low-current portion of the waveform. Moreover, by combining buck and buck-boost, the converter can step down the line input voltage.

The penalty paid for such flexibility is a doubling in the number of semiconductors required, as well as the necessity of at least one gate-drive transformer (or equivalent scheme) since Q41 and Q42 do not share common source connections.

Referring to FIG. 4b, to achieve the advantages of combined buck and buck-boost operation, the PFC controller operates the power converter in buck mode for as much of the line input voltage waveform as possible, thereby reducing current stress on the power transistors. For line voltages VLN below a selected threshold voltage Vthresh close to the load output voltage VLD, where buck mode cannot work, the PFC controller switches the power converter to buck-boost mode.

FIG. 5 is a simplified schematic of the exemplary PFC controller used in conjunction with an exemplary buck/buck-boost switch-mode power converter. The PFC controller selects either buck or buck-boost operation as appropriate. In either mode, the PFC controller implements power factor correction and peak current limiting. In particular, for both modes of operation, the PFC controller includes a piecewise-polynomial analog computer for computing the appropriate power transistor on-times for both power factor correction and peak current limiting.

2.2. Power Conversion. The buck/buck-boost power converter receives power from an AC line through an input LC filter Lf/Cf and a bridge rectifier BR. The rectified line input voltage waveform is designated VLN. After power conversion, the load voltage VLD appears at the output of the power converter.

The input filter Lf/Cf provides input line conditioning by blocking harmonic currents from the AC line, and should be designed specifically to maintain high power factor. Depending on the application, a more sophisticated, and more complicated, input filter might be required.

The filter capacitor Cf should be small enough to prevent an objectionable phase shift of the current from appearing at low output loads, but large enough to pass the harmonic currents without large swings of voltage. The filter inductor Lf should be as large as possible to provide maximum attenuation of the harmonic currents on the input line.

The buck/buck-boost converter topology comprises power switching transistors Q51 and Q52, diodes D51 and D52, current storage inductor L51, and bulk storage capacitor C51. Power transistor Q52 has its source connected to ground and can thus be driven directly by the PFC controller. However, power transistor Q51 should be driven through a gate drive transformer Tgd (or equivalent scheme) to provide isolation from the line.

The PFC controller controls the switching of the power transistors to effect combined buck and buck-boost operations. The PFC controller selects buck mode operation for most of the line input cycle (see, FIG. 4b), switching only Q51 and holding Q52 open.

When the line input voltage drops close to the load output voltage (i.e., to the voltage threshold Vthresh as shown in FIG. 4b), the PFC controller selects buck-boost operation, switching Q51 and Q52 in unison. Thus, the PFC controller selects the appropriate mode of operation by switching in or out Q52.

The PFC controller, which operates as a preregulator, requires an auxiliary power supply. A resistor Raux charges up a capacitor Caux from the high-voltage rectified line. An undervoltage lockout circuit (UVLO) is required to prevent operation of the controller if there is insufficient voltage to properly drive the power transistors. The UVLO includes a Schmitt trigger that senses the voltage on Caux and turns on when it reaches a predetermined threshold.

The Schmitt trigger typically incorporates several volts of hysteresis to allow the converter enough time to start up. During this time, the auxiliary winding Wzd on L51 which is connected to Caux through Daux acts as a flyback converter. Power is pumped into Caux only when the output capacitor C51 has reached a sufficiently high voltage, and therefore, considerable hysteresis is needed in the UVLO.

Due to the poor transient response of the power factor correction operation, the PFC controller will tend to overrespond to input transients, such as are always encountered at startup. Rather than attempting to include a rather complicated input voltage feedforward circuit (such as the Unitrode scheme described in the Background), which might be required for some applications, a simple overvoltage protection circuit is included for the exemplary PFC controller.

The overvoltage protection circuit includes an overvoltage protection comparator OVCP and a resistor divider network Rov1/Rov2. Load output voltage VLD is sensed by the resistor divider, and compared against an internal reference. In response, the OVPC comparator turns both outputs off if the instantaneous output voltage exceeds the threshold set. The threshold of this comparator should be substantially above the nominal load output voltage VLD to prevent drop-out from occurring (where, due to long periods of enforced shutdown, inadequate power is transferred to the auxiliary power supply capacitor Caux to keep the PFC controller running).

2.3. On-Time Control. The PFC controller effects power factor correction and peak current limiting by determining the on-times for the power transistors Q51 and Q52. Specifically, the PFC controller: (a) initiates a conduction cycle by switching on either Q51 (buck mode) or Q51 and Q52 (buck and buck-boost mode) when the current through the current storage inductor L51 has reached zero; (b) computes the appropriate on-time(s) for the power transistor(s) from instantaneous line input voltage VLN, instantaneous load output voltage VLD, and a current demand voltage VCD representative of long term average current (power) demand; (c) switches the power transistor(s) off after the computed on-time(s) to terminate the conduction cycle; and then (d) detects when inductor current reaches zero and initiates the next conduction cycle.

2.3.1. Zero Current Detection. The exemplary PFC controller initiates a conduction cycle by detecting when the rate of change of the current through the current storage inductor reaches zero—this condition in which dIL/dt is zero is designated as a zero current condition.

The zero current condition provides a reference from which the appropriate on-time(s) for the power transistor(s) can be computed. Alternatively, some other reference inductor current could be used so long as that reference current could be reliably detected.

Detecting the zero current condition for the current storage inductor L51 is done by monitoring the flyback potential on an auxiliary zero detect winding Wzd of the inductor. This winding cannot be used as a conventional current sense since the voltage developed here is not proportional to the current. It is, however, capable of detecting when dIL/dt falls to zero, because at this point the flyback potential vanishes.

Detecting the zero current condition using an auxiliary winding on the inductor does not suffer from the disadvantages inherent in direct current sensing. The winding is already present as part of the auxiliary power supply associated with the control circuit, and thus costs almost nothing. The voltage developed by this winding is quite large, and is thus highly immune to noise.

The voltage on the zero detect winding Wzd is sensed by a resistor Rzad, which provides a corresponding current sense signal. A current-mode zero current detect comparator ZCD compares the current sense signal with a reference, and provides a zero current detect signal indicating a zero current condition to a NOR gate NOR1 and an OR gate OR2.

2.3.2. Power Transistor Switching. NOR1 controls the switching of the power transistors Q51 and, in buck-boost mode, Q52. The output of NOR1 is coupled to the gate drive transformer Tgd for power transistor Q51 and, through an AND gate AND1, to the gate of the power transistor Q52.

In response to receipt of a zero current detect signal, NOR1 begins a conduction cycle by switching on Q51, and in buck-boost mode, Q52. This conduction cycle terminates after a computed ton period that is appropriated for either power factor correction or peak current limiting.

ORI controls the charge/discharge cycle of a timing capacitor Cton. The output of ORI is coupled to a discharge switch for the timing capacitor. Just prior to the beginning of a conduction cycle, the timing capacitor will be completely discharged. When a conduction cycle is begun by a zero current detect signal from the zero current detect comparator, ORI opens the discharge switch, allowing a current source It to charge the timing capacitor.

The voltage on the timing capacitor Cton is input to a ton comparator TON, which receives as its other input a ton voltage Vton from a piecewise-polynomial analog computer AC. The piecewise-polynomial analog computer computes the appropriate on-time(s) for the power transistors, and outputs the representative voltage Vton.

The on-time duration voltage Vton provides a ton threshold for the ton comparator TON. When the comparator senses that the voltage on the timing capacitor Cton has exceeded the ton threshold, it provides a corresponding toff indication to ORI, which switches the power transistor(s) off, thereby establishing on-time duration.

With the power transistor(s) off, a flyback period begins and the inductor current ramps down. Simultaneously, the timing capacitor Cton is discharged in preparation for the next conduction cycle beginning with a zero inductor current condition.

Under certain operating conditions for the power converter, the zero current condition is difficult to detect: when the line input voltage is low and when the load output voltage is low. Under these conditions, detecting dIL/dt is difficult. The exemplary PFC controller uses a conventional hiccup scheme to turn on the power transistor(s) after a predetermined time long enough to ensure that inductor current has fallen to zero.

A conventional hiccup timer circuit HT includes a hiccup timer capacitor that is charged by a current source. The hiccup timer circuit is reset by NOR1 each time it switches on the power transistor(s) at the beginning of a conduction cycle, i.e., each time NOR1 receives the normal zero current detect signal from the zero current detect comparator ZCD indicating dIL/dt equal to zero.

During conditions in which the zero current detect compactor ZCD cannot detect dIL/dt equal to zero, it will not provide the zero current detect signal to NOR1, the power transistor(s) will not be switched on, and the hiccup timer circuit will not be reset. In this case, when the voltage on the hiccup timer capacitor rises above a predetermined threshold, the hiccup timer circuit provides a zero current condition signal to both NOR1 and OR1, initiating a conduction cycle.

This action continues until the zero current detect comparator ZCD is able to detect dIL/dt equal to zero, and provide the normal zero current detect signal for controlling NOR1 and OR1.

The time duration of the hiccup timer should be sufficiently long to ensure that the inductor does not saturate during startup. However, the hiccup time interval should be sufficiently short when the circuit is running normally so that power factor correction in not significantly compromised by waveform irregularities exciting ringing in the high-Q input filter stage. When the circuit is running normally, the hiccup circuit restarts the PFC controller each time VLN passes through zero.

For the exemplary PFC controller, the hiccup current used to charge the hiccup timer capacitor is made to follow the sum of minimum current (for saturation protection during startup) and a term proportional to the output voltage. As output voltage rises, the hiccup charging current increases, and the hiccup time becomes smaller. When the output voltage reaches regulation, the hiccup interval is quite short (but not shorter than the normal off-time).

2.3.2. Ton Computation. The PFC controller uses a piecewise-polynomial analog computer AC to compute the appropriate on-times for both power factor control and peak current limiting, in both buck and buck-boost operational modes. That is, for both operational modes, the piecewise-polynomial analog computer embodies a separate piecewise-polynomial transfer function including two transfer function segments: a power factor control transfer function segment, and a peak current limiting transfer function segment.

Figure 6A:
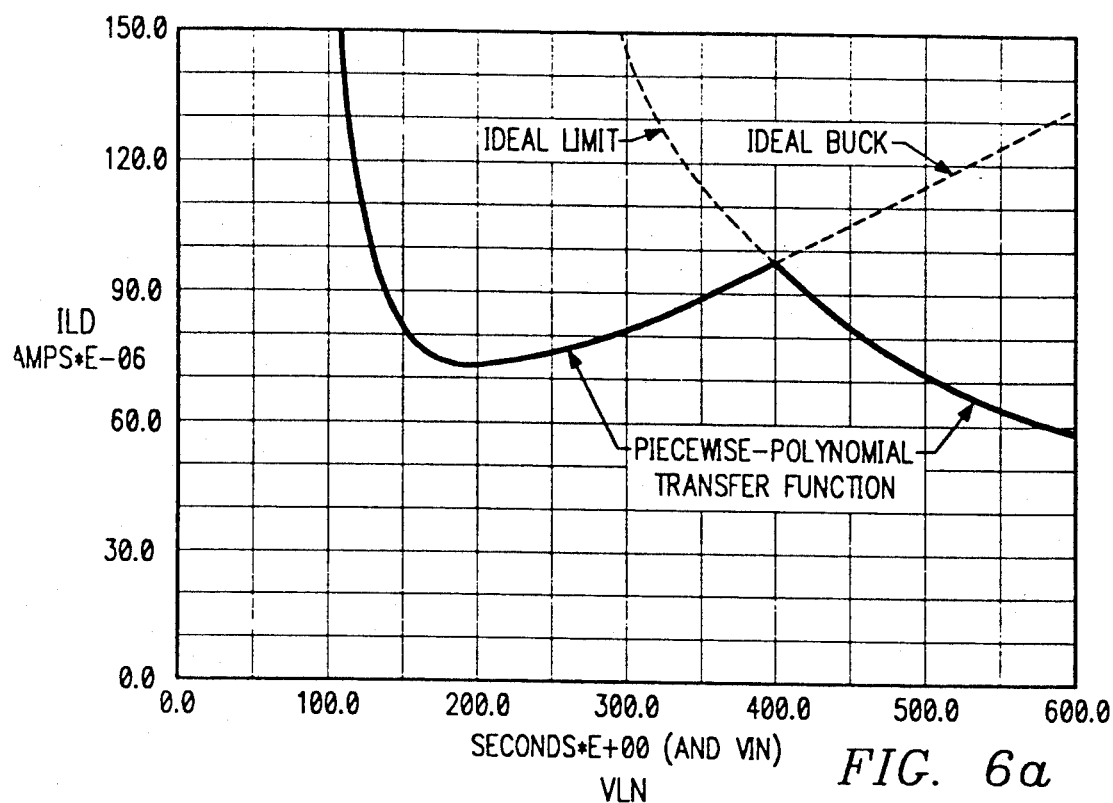
FIGS. 6a-6b are plots, respectively for buck and buck-boost modes, illustrating the piecewise-polynomial transfer function implemented by the PFC controller, and in particular, the polynomial transfer function segments associated with power factor correction and peak current limiting.
Figure 6B:
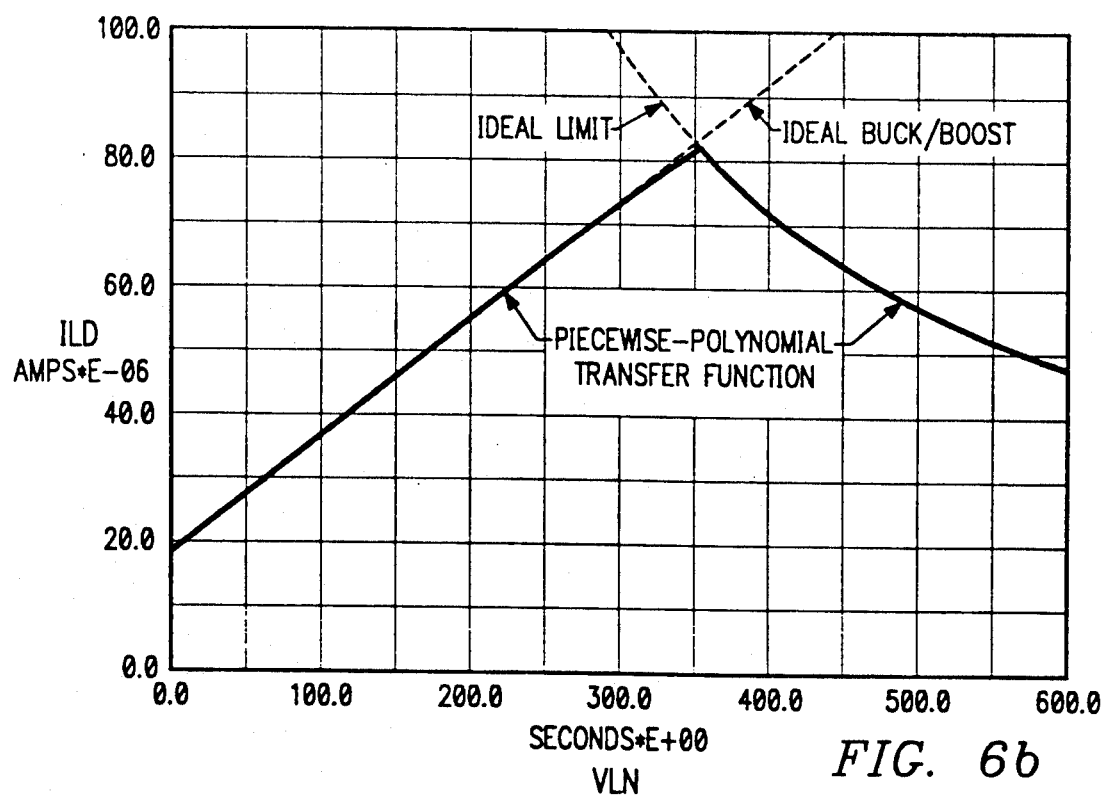

FIGS. 6a and 6b are plots showing the piecewise-polynomial transfer functions for the buck and buck-boost modes that must be implemented by the piecewise-polynomial analog computer. Each plot shows separate polynomial functions for ideal buck or buck-boost power-factor control operation and for ideal current-limit control operation. The curves for these functions intersect a breakpoint -- the piecewise-polynomial transfer function includes polynomial transfer function segments for both power-factor control and current-limiting operations.

As described in Section 2.5, for the exemplary PFC controller, the piecewise-polynomial analog computer is implemented by the piecewise-polynomial function generator disclosed in the Related Application. Basically, for power-factor control operations, the piecewise-polynomial analog computer computes power transistor on-times as a function of long-term average current (power) demand, while for operations requiring peak current limiting, on-times are computed without regard to current demand.

From Section the piecewise-polynomial analog computer is required to compute the on-times according to the following piecewise-polynomial transfer function:

For buck-mode operations $$ton = \frac{VLN^2}{(VLN - VLD) \cdot VLD} \cdot VCD \cdot \alpha$$

$$ton(\text{limit}) = \frac{1}{(VLN - VLD)} \cdot L \cdot Ilimit$$

For buck-boost mode operations $$ton = \frac{(VLN + VLD)}{VLD} \cdot VCD \cdot \alpha$$

$$ton(\text{limit}) = \frac{1}{VLN} \cdot L \cdot Ilimit$$

where, for both modes of operation, the expression for ton corresponds to the power-factor control transfer function segment, and the expression for ton(limit) corresponds to the current-limit control transfer function segment.

In accordance with this piecewise-polynomial transfer function, the inputs to the piecewise-polynomial analog computer are currents representative of the instantaneous line input and load output voltages VLN and VLD, and a voltage VCD representing long term average current (power) demand.

The instantaneous line input voltage VLN is applied to an external resistor RLN to obtain a corresponding current ILN. Similarly, the instantaneous load output voltage VLD is applied to an external resistor RLD to obtain a corresponding current ILD.

The average level of power demanded by the power converter is represented by a current ICD from a voltage-mode current demand amplifier CD. The current demand amplifier compares the load output voltage VLD of the power converter, stepped down through a resistor divider Rcd1 and Rcd2, against an internal 5 V voltage reference. The difference of these two signals is amplified to form the current demand current ICD.

For power-factor control operations (i.e., assuming that the predetermined peak current limit is not exceeded), if the load output voltage VLD (divided down by a suitable amount) is below the reference voltage, the current demand current increases to increase power transistor on-time, and thereby increase power transfer to the output capacitor. Similarly, if the load voltage is high, then the current demand current ICD decreases to reduce the power transferred to the output.

A feedback capacitor Ccd is connected around the current demand amplifier to provide a single dominant pole response by the Miller effect. This pole is placed at one-half or less of the line frequency so that the line voltage does not modulate the power transfer of the converter (this cannot be allowed if the converter is to properly power factor correct).

FIGS. 7a–7c illustrate the operation of the PFC controller in both buck and buck-boost modes, and under both power-factor control and peak current-limit conditions. In particular, each plot includes curves for three separate line input voltages VLN1, VLN2, and VLN3.

2.4. Mode Selection. The PFC controller switches between buck and buck-boost mode operation for the power converter: when the line voltage is below a certain threshold voltage, the converter runs in buck-boost mode, and when it is above this threshold, it runs in buck mode. See, FIG. 4b and FIGS. 7a and 7b.

A threshold comparator TH compares a stepped-down version of the instantaneous input voltage VLN against an internal voltage reference to decide which mode of operation to employ. A slight degree of hysteresis is employed to prevent chattering from occurring due to noise on the input line.

The threshold comparator provides an active or inactive mode selection output to the AND gate AND1, which controls the switching of the power transistor Q52. For buck-boost mode operation, the mode selection output is active, so that Q52 can be switched on and off by NOR1. For buck mode operation, the mode selection output is switched inactive and AND1 prevents NOR1 from switching Q52 on during a conduction cycle. Preferably, circuitry (not shown) is included to ensure that the mode does not change in mid-cycle, although this is not absolutely necessary.

2.5. Piecewise Polynomial Analog Computer. The PFC control function actually involves two distinct control functions: power factor correction and peak current limiting. Stated another way, for both the buck and buck-boost power conversion modes, the PFC controller is required to implement two separate transfer functions: (a) a power-factor control function in which power-transistor on-time is controlled in accordance with power demand and power factor correction requirements, and (b) a current-limit control function in which power-transistor on-time is controlled in accordance with peak current limiting requirements (regardless of power demand or power factor correction).

The PFC controller implements these control functions using computational techniques that allow both average and peak current through the inductor to be computed, using as input variables the instantaneous line input and load output voltages and a current (power) demand value representing long-term output voltage. In particular, the power-factor control function is derived from a polynomial relationship between power-transistor on-time and the average inductor current, while the current-limit control function is derived from the polynomial relationship between power-transistor on-time and a predetermined peak current.

The PFC controller implements power-factor and current limit control functions under control of the piecewise-polynomial analog computer—this analog computer comprises the piecewise-polynomial function generator described in the Related Application. The piecewise-polynomial function generator is implemented by interdependent translinear circuits.

FIGS. 8a and 8b are simplified schematics of the piecewise-polynomial function generator used to implement the piecewise-polynomial analog computer. FIG. 8a illustrates a translinear network comprised of interdependent translinear circuits, and FIG. 8b illustrates the current source network for the translinear network.

Referring to FIG. 8a, the translinear network includes two interdependent translinear circuits each characterized by a separate polynomial transfer function. A power-factor control translinear circuit is formed by transistors QC1-QC2-QC3/QC4-QC5-QC6, and a current-limit control translinear circuit is formed by transistors QC5-QC6/QC7-QC8. These translinear circuits are interdependent in that QC5 and QC6 are common to both circuits.

The translinear network also includes current sources Ia, Ib, Ic, Id, Ie, If, and Ig. These currents flow respectively through the transistors QC1 (assuming that QC9 is off), QC2, QC3, QC4, QC5, QC7, and QC8. The current Ix flows through QC6, and is the output current for both power-factor control QC1-QC2-QC3/QC4-QC5-QC6 and the current-limit control QC5-QC6/QC7-QC8—at any given time, the current Ix will be under control of the one of the interdependent translinear circuits that is active.

The current Ix also flows through the current mirror pair QC10 and QC11, and constitutes the output current Iout for the piecewise-polynomial function generator. Thus, at any given time, the output current Iout, which is used by the piecewise-polynomial analog computer to provide on-time control for the power transistors, is determined by whichever of the power-factor control or current-limit control translinear circuits is active and controlling the current Ix.

PNP transistor QC9 functions as a unipolar current amplifier/comparator that controls the operational state of the translinear network by determining which translinear circuit is active, i.e., controlling the current Ix through QC6, and therefore, the output current Iout for the piecewise-polynomial function generator. Specifically, this transistor interconnects the translinear circuits, providing an active feedback loop to implement the voltage clamping in the power-factor control circuit that establishes the operational breakpoint between it and the current-limit control circuit.

When the interdependent translinear circuits are operating such that QC8 collector current Iy is less than Ig, QC9 is off (it is assumed that current source Ig can pull up far enough to turn QC9 off), and the current output Ix is determined by the power factor control circuit QC1-QC2-QC3/QC4-QC5-QC6. In accordance with the translinear principle, this power factor control circuit is characterized by a polynomial transfer function that can be expressed either in terms of either current Ix (the output current Iout of the representative of power-transistor on-time), or the QC9 collector current Iy:

$$Ix = \frac{Ia \cdot Ib \cdot Ic}{Id \cdot Ie}$$

$$Iy = \frac{Ia \cdot Ib \cdot Ic}{Id \cdot If}$$

When the QC8 collector current Iy just exceeds Ig, transistor QC9 will turn on and rob collector current from transistor QC1, i.e. rob some of the current from current source Ia that is supplying that collector current. Since the QC1 collector drive is reduced, and since the currents through QC2, QC3, QC4, QC5, and QC7 are set by the respective current sources Ib, Ic, Id, Ie, and If, then in accordance with translinear operation the currents through QC6 and QC8—Ix and Iy—are also reduced proportionally.

As a result, Iy is reduced until Iy is approximately equal to Ig, and the translinear network will then continue to regulate at this point, even when other input currents (such as Ib) continue to increase. Thus, the active feedback provided by QC9 prevents the QC8 collector current Iy from increasing beyond Ig.

With Iy equal to Ig, the current Ix (the output current Iout representative of power-transistor on-time) can be expressed in terms of Ig:

$$Ix = \frac{If \cdot Ig}{Ie}$$

This expression, however, is the polynomial transfer function for the current-limit translinear circuit QC5-QC6/QC7-QC8.

Thus, the piecewise-polynomial function generator computes the following piecewise-polynomial function:

$$Ix = \begin{cases} \frac{Ia \cdot Ib \cdot Ic}{Id \cdot Ie} & \text{when } Iy < Ig \\ \frac{If \cdot Ig}{Ie} & \text{when } Iy = Ig \end{cases}$$

That is, the operational breakpoint for the piecewise-polynomial function generator—between the power-factor control and current-limit control transfer functions—is determined by the value of the collector current Iy through QC8 and the current source Ig.

The transistor QC9 can be considered a unipolar current amplifier/comparator that compares the currents Ig and Iy, and amplifies the difference which becomes an error signal at the base QC9 to force an output current at its emitter that is beta times the base current. This current-mode feedback loop forces the voltage of the regulated node at the base of QC5 to a breakpoint voltage, such that the current Ix is controlled by the current-limit control translinear circuit.

As described in Section 2.3.3, this operational breakpoint is determined by using the active feedback provided by the unipolar current amplifier/comparator QC9 to clamp the base of QC5 when the voltage at that node of the power-factor control circuit reaches a predetermined virtual breakpoint voltage determined by the current-limit control circuit, thereby establishing the breakpoint between the power-factor control and current-limit control transfer functions.

To implement PFC controller operation using the piecewise-polynomial function generator, the currents Ia, Ib, Ic, Id, Ie, If, and Ig are inputs to the function generator, which computes the corresponding power transistor on-times according to the appropriate power-factor or current-limit control transfer function. These currents are either constants, or derived from the three inputs used by the PFC controller, and the piecewise-polynomial analog computer, to compute power-transistor on-times: the line input voltage VLN, the load output voltage VLD, and the current (power) demand voltage VCD.

Specifically, current source Ia is a function of the current demand voltage VCD. The current sources If and Ig are constant current sources (they are implemented with lateral PNP transistors). The current sources Ib, Ic, Id, and Ie are determined by the current source network.

Referring to FIG. 8b, the current source network generates the current sources Ib, Ic, Id, and Ie as a function of the line and load voltages VLN and VLD.

These voltages are converted into currents ILN and ILD by resistors RLN and RLD.

Transistors QC20, QC21, and QC22 establish an ILD current mirror rail that controls transistors QC30, QC31, and QC34. Transistors QC23, QC24, and QC25 establish an ILN current mirror rail that controls transistors QC26, QC27, and QC35. Transistor pairs QC28/QC29 and QC32/QC33 selectively implement current addition operations under external control depending upon whether the PFC controller is operating in buck or buck-boost mode.

2.5.1. Power-Factor Control. The power-factor control transfer function is implemented by the power-factor control translinear circuit QC1-QC2-QC3/QC4-QC5-QC6. This transfer function controls power switching on-times while the PFC controller is operating in the non-current-limiting state, and can be expressed in terms of currents:

For buck-mode operations
$$ton = \frac{ILN^2}{(ILN - ILD) \cdot ILD} \cdot ICD \cdot \beta$$

For buck-boost mode operations
$$ton = \frac{(ILN + ILD)}{ILD} \cdot ICD \cdot \beta$$

where ICD is a current derived from VCD (which is related to long term current demand), and $\beta$ is a constant of proportionality with units of time/current (its relationship to the proportionality constant o is a function of the resistors converting voltage to current).

The power-factor control circuit solves equations of the form:

$$Ix = \frac{Ia \cdot Ib \cdot Ic}{Id \cdot Ie}$$

So, the current inputs are:
Ia=G·VCD where G is a proportionality constant with units of 1/ohms.
Ib=ILN
Ic=ILN in Buck mode, or (ILN+ILD) in Buck/Boost mode
Id=ILD
Ie=(ILN−ILD) in Buck mode, or ILN in Buck/Boost mode Note that, for buck/boost mode, direct substitution of the current values yields:

$$ton = \frac{(ILN + ILD) \cdot ILN}{ILD \cdot ILN} \cdot ICD \cdot \beta$$

While the ILN terms mathematically cancel (yielding the correct expression for ton), the operation is potentially unstable as ILN approaches zero. This instability can be avoided by adding a small current to Ib and Ie when in buck-boost mode (although, it must be insured that this extra current is removed before reaching limit mode, such as by removing it when ILN exceeds some value.

2.5.2. Current Limit Control. The current-limit control transfer function is implemented by the power-factor control translinear circuit QC5- QC6/QC7-QC8. This transfer function controls power switching on-times while the PFC controller is operating in the current-limiting state, and can be expressed in terms of currents:

For buck mode operations:

$$ton(\text{limit}) = \frac{1}{(ILN - ILD)} \cdot L \cdot Ilimit \cdot K$$

For buck-boost mode operations:

$$ton(\text{limit}) = \frac{1}{ILN} \cdot L \cdot Ilimit \cdot K$$

where K is a constant of proportionality related to the resistances that change voltages to current. The current-limit control circuit solves equations of the form:

$$Ix = \frac{If \cdot Ig}{Ie}$$

So, the current inputs are:
 If = a constant that determines K
 Ig = a constant that determines K
 Ie = (ILN − ILD) in Buck mode, or ILN in Buck-Boost mode Note that, in either mode, the transfer function is independent of current demand ICD.

2.5.3. Breakpoint Voltage Clamping. Referring to FIG. 8a, in the exemplary piecewise-polynomial function generator, the operational breakpoint between the power-factor and current-limit control translinear circuits is implemented by clamping the node at the base of QC5 in the power-factor control circuit when it reaches a virtual breakpoint voltage that is determined by the current-limit control circuit QC5–QC6/QC7–QC8. Specifically, voltage clamping is accomplished by means of the unipolar current amplifier/comparator QC9, and the virtual breakpoint voltage is determined by selecting the value for the constant current sources If and Ig.

If the piecewise-polynomial function generator is operating in the power-factor control segment of its piecewise-polynomial transfer function (i.e., the current through the current storage inductor in the power converter is below the design limit), then the voltage at the base of QC5, and therefore the base of QC7, is below the breakpoint voltage. In this case, the power-factor control translinear circuit QC1–QC2–QC3/QC4–QC5–QC6 controls the current Ix, and therefore the output current Iout.

In this operational state, the voltage at the base of QC8 is such that its collector current Iy is less than the current Ig, and QC9 is off (the lateral PNP current source saturates trying to drive Ig through QC8). In that regard, note that the Vbe of QC7 is set by the constant current source If so that any change in the voltage at the base of QC5 is reflected in a change in the Vbe of QC8 (and in a corresponding change in its collector current Iy).

If at any instant in time the inputs to the power-factor control translinear circuit Ia, Ib, Ic, Id, and Ie are such that the base voltage for QC5 attempts to rise above the breakpoint voltage, this rise will be reflected in a corresponding rise in the Vbe of QC8, and its collector current Iy will increase to greater than Ig. Since Ig cannot supply the increase in current, that current must come from the base or QC9, and it turns on.

QC9 then robs current from the current source Ia (which is a function of the current demand ICD), reducing the collector current IC1 of QC1. When the collector current IC1 falls, the Vbe of QC1 falls, so that the base voltage of QC1 falls. The Vbe for each of QC2, QC3, and QC4 remains the same (Ib, Ic, and Id do not change), so that the voltage at the base of QC5 falls—the desired breakpoint voltage regulating effect. The fall in voltage at the base of QC5, and therefore QC8, causes a corresponding reduction in the Vbe of QC8, and therefore in its collector current Iy, thereby reducing the need for QC8 to draw base current from QC9.

Thus, QC9 establishes an active feedback loop in which any increase in voltage at the regulated node (the base of QC5) above the breakpoint voltage is translated by the action of QC8 into an increase in QC9 base current. This base current increase causes an amplified reduction in the QC1 collector current IC1, thereby counteracting the increase in the voltage of the regulated node in the power-factor control translinear circuit. Note that because the amplifier/comparator is unipolar, the voltage does not attempt to regulate if it is below the breakpoint voltage.

While the voltage at the bases of QC5 and QC7 are clamped at the breakpoint voltage, the current-limit control translinear circuit controls the current Ix, and therefore the output current Iout. The breakpoint voltage for the regulated node is derived from the current-limit control translinear circuit (Ig and Iy).

In summary, the exemplary piecewise-polynomial function generator performs analog computations according to a piecewise-polynomial transfer function with two polynomial transfer function segments: a power-factor control segment and a current-limit segment. While the piecewise-polynomial function generator is operating below a predetermined operational breakpoint represented by a breakpoint voltage associated with one of the nodes of the power-factor control translinear circuit, that circuit determines the output of the function generator, and therefore the on-times for the power switching transistors controlled by the PFC controller. When inductor current exceeds the design limit, the current-limit control translinear circuit assumes control of function generator output, and therefore power-transistor on-times. The operational breakpoint between the power-factor control and current-limit control transfer functions is determined by a breakpoint voltage for one of the nodes in the power-factor control circuit, which is derived from the current-limit control circuit.

3. Exemplary Applications. The PFC control techniques of the invention are generally applicable to solid-state switch-mode power converters for any equipment that normally requires an electronic power supply. Some examples include: (a) personal computers, (b) workstations, (c) electronic lamp ballasts, and (d) consumer electronics.

4. Conclusion. Although the Detailed Description of the invention has been directed to certain exemplary embodiments, various modifications of these exemplary embodiments, as well as alternative embodiments, will be suggested to those skilled in the art. In particular, modification of the exemplary PFC controller for a given application involves routine engineering design choices.

It is to be understood that the invention encompass any modifications or alternative embodiments that fall within the scope of the appended Claims.

What is claimed is:

1. A power factor correction (PFC) control method for power factor correcting a switch-mode power converter that includes a current storage inductor and at least one power switching component coupled to receive line input voltage VLN and current ILN, and that provides a converted load output voltage VLD, comprising the steps:
  for each of successive conduction cycles, activating the power switching component to initiate the conduction cycle by causing an increase in the inductor current through the current storage inductor;
  detecting the line voltage VLN and the load voltage VLD, and generating corresponding VLN and VLD representations;
  determining a power demand representation VCD corresponding to long term average power demand;
  computing an on-time period for activating the power switching component in accordance with the relationship between a power-factor corrected average current through the current storage inductor and the known representations for VLN, VLD, and VCD, such that the operation of the power converter is power factor corrected;
  at the end of the computed on-time, deactivating the power switching component to terminate the conduction cycle and allow the inductor current to decay; and
  determining when the inductor current is about equal to a reference inductor current, and then activating the power switching component to initiate the next conduction cycle.

2. The PFC control method of claim 1, wherein the power converter operates in buck mode, and wherein the power demand representation VCD is a voltage, and wherein the step of computing on-times is accomplished in accordance with the following relationships for the average current through the current storage inductor Iavg and the on-time for the power switching component ton:

$$Iavg = \frac{(VLN - VLD) \cdot VLD}{2 \cdot L \cdot VLN} \cdot ton$$

$$ton = \frac{VLN^2}{(VLN - VLD) \cdot VLD} \cdot VCD \cdot \alpha$$

where α is a constant of proportionality (with units of time/voltage).

3. The PFC control method of claim 2, wherein the power converter includes at least two power switching components and selectably operates in either buck or buck-boost mode, and wherein, during buck-boost operations, the step of computing on-times is accomplished in accordance with the following relationships for the average current through the current storage inductor Iavg and the on-time for the power switching component on:

$$Iavg = \frac{VLN \cdot VLD}{2 \cdot L \cdot (VLN + VLD)} \cdot ton$$

$$ton = \frac{(VLN + VLD)}{VLD} \cdot VCD \cdot \alpha$$

where α is a constant of proportionality (with units of time/voltage).

4. The PFC control method of claim 1, further comprising the step:
  computing a current limiting on-time period for activating the power switching component in accordance with the relationship between a predetermined peak current limit and the known representations for VLN and VLD, such that the operation of the power converter is peak current limited.

5. The PFC control method of claim 4, wherein the power converter operates in buck mode, and wherein the step of computing current limiting on-times is accomplished in accordance with the following relationship for the current limiting on-time for the power switching component ton(limit):

$$ton(limit) = \frac{1}{VLN - VLD} \cdot L \cdot Ilimit$$

where L is effective inductance, and Ilimit is the predetermined peak current limit.

6. The PFC control method of claim 5, wherein the power converter includes at least two power switching components and selectably operates in either buck or buck-boost mode, and wherein, during buck-boost operations, the step of computing current limiting on-times is accomplished in accordance with the following relationship for the current limiting on-time for the power switching component ton(limit):

$$ton(limit) = \frac{1}{VLN} \cdot L \cdot Ilimit$$

where L is effective inductance and Ilimit is the predetermined peak current limit.

7. The PFC control method of claim 1, wherein the reference inductor current is zero, and wherein the step of determining when the inductor current is about equal to the reference inductor current is accomplished by determining when a zero detect condition has occurred in which the rate of change of the inductor current (dIL/dt) is about zero, such that the inductor current need not be directly sensed.

8. The PFC control method of claim 7, wherein dIL/dt is detected using an auxiliary winding of the current storage inductor, and wherein the step of determining the zero detect condition is accomplished by comparing the current from said auxiliary winding with a reference.

9. The PFC control method of claim 8, further comprising the step of:
  timing the period after deactivation of said power switching component, and if the zero detect condition is not detected for a hiccup time period, activating said power switching component, such that a conduction cycle is begun even if VLN and VLD ar such that it is difficult to detect the zero detect condition.

10. The PFC control method of claim 9, wherein the hiccup time period is adjustable in direct relation to the magnitude of VLD.

11. The PFC control method of claim 1, wherein the step of deactivating the power switching component at the end of the computed on-time comprises the steps:
  during each conduction cycle, charging a timing capacitor at a predetermined rate
  generating an on-time voltage Vton representative of the computed on-time or computed current limiting on-time, to establish the time for deactivating the power switching component;
  comparing the timing capacitor voltage with the on-time voltage Vton;

when the timing capacitor voltage reaches the Vton threshold, deactivating the power switching component to terminate the conduction cycle; and discharging the timing capacitor in preparation for the next conduction cycle.

12. The PFC control method of claim 1, wherein the power converter includes at least two power switching components, further comprising the steps:

selecting buck mode operation when the magnitude of the line input voltage VLN is above a predetermined buck/buck-boost threshold; and otherwise, selecting buck-boost mode operation.

13. The PFC control method of claim 12, wherein the steps for selecting either buck or buck-boost mode operation are accomplished by:

comparing a representation of the line input voltage VLN with a reference corresponding to the predetermined buck/buck-boost threshold; and selecting buck mode operation with the VLN representation is greater than the threshold reference, and selecting buck-boost mode operation when the VLN representation is less than the threshold reference.

14. The PFC control method of claim 1, wherein the VLN, VLD, and VCD representations are respective current representations designated ILN, ILD, and ICD, and the step of computing on-times is accomplished by analog computation with such current representations.

15. The PFC control method of claim 4, wherein the VLN, VLD, and VCD representations are respective current representations designated ILN, ILD, and ICD, and wherein the steps of computing both on-times and current limiting on-times are accomplished by analog computation that implements a piecewise-polynomial transfer function according to the following steps:

providing at least first and second translinear circuits respectively characterized by power-factor control and current-limit control polynomial transfer function segments of the piecewise-polynomial transfer function;

said power-factor control transfer function segment being implemented in computing on-times, and said current-limit control transfer function segment being implemented in computing current-limiting on-times; and clamping the voltage of at least one internal node of said first translinear circuit to a virtual breakpoint voltage derived from said second translinear circuit;

such that when said regulated node is at a voltage less than the virtual breakpoint voltage said first translinear circuit is active and implements the associated power-factor control transfer function segment, and when said regulated node is at a virtual voltage equal to the breakpoint voltage said second translinear circuit is active and implements the associated current-limit transfer function segment.

16. The PFC control method of claim 15, wherein the step of clamping comprises:

comparing the current at a comparison node of said second translinear circuit with a reference to establish a breakpoint condition; and when the breakpoint condition is detected, altering current from a node in said first translinear circuit, thereby altering collector current through an associated transistor;

such that the voltage at said regulated node is regulated at the breakpoint voltage.

17. The PFC control method of claim 16, wherein the breakpoint condition is reached when the current through said comparison node exceeds a reference current.

18. The PFC controller of claim 1, wherein said on-time control network also computes a current limiting on-time period for activating the power switching component in accordance with the relationship between the predetermined peak current limit and the known representations for VLN and VLD, such that the operation of the power converter is peak current limited.

19. The PFC controller of claim 18, wherein the power converter operates in buck mode, and wherein said on-time control network computes current limiting on-times in accordance with the following relationship for the current limiting on-time for the power switching component ton(limit):

$$ton(\text{limit}) = \frac{1}{VLN - VLD} \cdot L \cdot Ilimit$$

where L is effective inductance, and Ilimit is the predetermined peak current limit.

20. The PFC controller of claim 19, wherein the power converter includes at least two power switching components and selectably operates in either buck or buck-boost mode, and wherein, during buck-boost operations, said on-time control network computes current limiting on-times in accordance with the following relationship for the current limiting on-time for the power switching component ton(limit):

$$ton(\text{limit}) = \frac{1}{VLN} \cdot L \cdot Ilimit$$

where L is effective inductance and Ilimit is the predetermined peak current limit.

21. The PFC controller of claim 18, wherein the VLN, VLD, and VCD representations are respective current representations designated ILN, ILD, and ICD, ad wherein said on-time control network includes:

a piecewise-polynomial analog computer for computing both on-times and current limiting on-times in accordance with a piecewise-polynomial transfer function with at least two segments, a power-factor control transfer function segment and a current-limit control transfer function segment;

said piecewise-polynomial analog computer computing on-times according to the power-factor control transfer function, and computing current limiting on-times according to the current-limit control transfer function.

22. The PFC controller of claim 21, wherein said piecewise polynomial analog computer comprises:

at least first and second translinear circuits respectively characterized by the power-factor control and current-limit control polynomial transfer function segments; and a clamping circuit for clamping the voltage of at least one internal node of said first translinear circuit to a virtual breakpoint voltage derived from said second translinear circuit;

such that when said regulated node is at a voltage less than the virtual breakpoint voltage said first translinear circuit is active and the function generator implements the associated power-factor control transfer function segment, and when said regulated node is at a virtual voltage equal to the breakpoint voltage said second translinear circuit is active and the function generator implements the associated current-limit control transfer function segment.

23. The PFC control method of claim 22, wherein said clamping circuit comprises:
   a current comparator/amplifier coupled to a comparison node in said second translinear circuit and to a collector node in said first translinear circuit for comparing the current at said comparison node with a reference to establish a breakpoint condition;
   such that when the breakpoint condition is detected, said current comparator/amplifier robs current from said collector node, and thereby robs collector current from a transistor associated with said first translinear circuit; and
   such that the voltage at said regulated node is regulated at the breakpoint voltage.

24. The PFC control method of claim 23, wherein said current comparator/amplifier comprises:
   a bipolar PNP transistor having its emitter coupled to said collector node, and its base coupled to said comparison node through which flows the collector current for a transistor in said second translinear circuit;
   such that when the voltage of the regulated node rises above the virtual breakpoint voltage, the corresponding voltage at the base of said bipolar transistor decreases, causing it to turn on and rob collector current said collector node, thereby causing a corresponding decrease in voltage at the regulated node.

25. The PFC controller of claim 1, wherein the reference inductor current is zero, and wherein said inductor current detection circuit comprises a zero current detection circuit for determining when a zero detect condition has occurred in which the rate of change of the inductor current (dIL/dt) is about zero, such that the inductor current need not be directly sensed.

26. The PFC controller of claim 25, wherein said zero current detection circuit includes an auxiliary winding of the current storage inductor, such that the zero detect condition is determined by comparing the current from said auxiliary winding with a reference.

27. The PFC controller of claim 26, further comprising a hiccup timer circuit for timing the period after deactivation of said power switching component, and if the zero detect condition is not detected for a hiccup time period, activating the power switching component, such that a conduction cycle is begun even if VLN and VLD are such that it is difficult to detect the zero detect condition.

28. The PFC controller of claim 27, wherein the hiccup time period is adjustable in direct relation to the magnitude of VLD.

29. A power factor correction (PFC) controller for power factor correcting a switch-mode power converter that includes a current storage inductor and at least one power switching component coupled to receive line input voltage VLN and current ILN, and that provides a converted load output voltage VLD, comprising:
   an on-time control network for successively activating and deactivating the power switching component to effect successive conduction cycles such that during an activation period the inductor current through the current storage inductor increases from a reference inductor current and during the deactivation period the inductor current decreases to the reference inductor current;
   said on-time control network being responsive to representations of the line voltage VLN and the load voltage VLD, and to a representation of power demand VCD corresponding to long term average power demand for computing an on-time period for activating the power switching component in accordance with the relationship between a power-factor corrected average current through the current storage inductor and the known representations for VLN, VLD, and VCD, such that the operation of the power converter is power factor corrected;
   at the end of the computed on-time, said on-time control network deactivating the power switching component to terminate the conduction cycle; and
   an inductor current detection circuit for determining when the inductor current is about equal to the reference inductor current, and providing a reference current detect signal to said on-time control network, which activates the power switching component to initiate the next conduction cycle.

30. The PFC controller of claim 29, wherein said on-time control network includes:
   a timing capacitor that, during each conduction cycle, is charged at a predetermined rate;
   a comparator for comparing the timing capacitor voltage with an on-time voltage Vton representative of the computed on-time or the computed current limiting on-time;
   such that when the timing capacitor voltage reaches the Vton threshold, said comparator deactivates the power switching component to terminate the conduction cycle; and
   discharge means for discharging the timing capacitor prior to the initiation of a conduction cycle.

31. The PFC controller of claim 18, wherein the VLN, VLD, and VCD representations are respective current representations designated ILN, ILD, and ICD, and wherein said on-time control network includes an analog computation device for computing on-times using such current representations.

32. The PFC controller of claim 29, wherein the power converter operates in buck mode, and wherein the power demand representation VCD is a voltage, and wherein said on-time control network computes on-times in accordance with the following relationships for the average current through the current storage inductor Iavg and the on-time for the power switching component ton:

$$Iavg = \frac{(VLN - VLD) \cdot VLD}{2 \cdot L \cdot VLN} \cdot ton$$

$$ton = \frac{VLN^2}{(VLN - VLD) \cdot VLD} \cdot VCD \cdot \alpha$$

where $\alpha$ is an constant of proportionality (with units of time/voltage).

33. The PFC controller of claim 32, wherein the power converter includes at least two power switching components and selectably operates in either buck or buck-boost mode, and wherein, during buck-boost operations, the on-time control network computes on-times in accordance with the following relationships for the average current through the current storage inductor Iavg and the on-time for the power switching component ton:

$$Iavg = \frac{VLN \cdot VLD}{2 \cdot L \cdot (VLN + VLD)} \cdot ton$$

$$ton = \frac{(VLN + VLD)}{VLD} \cdot VCD \cdot \alpha$$

where $\alpha$ is an constant of proportionality (with units of time/voltage).

34. The PFC controller of claim 29, wherein the power converter includes at least two power switching components, further comprising:
 a mode selection circuit for selecting buck mode operation when the magnitude of the line input voltage VLN is above a predetermined buck/buck-boost threshold, and otherwise selecting buck-boost mode operation.

35. The PFC controller of claim 29, wherein said mode selection circuit comprises:
 a mode selection comparator for comparing a representation of the line input voltage VLN with a reference corresponding to the predetermined buck/buck-boost threshold.

36. A power factor correction (PFC) controller for effecting power factor correction and peak current limiting for a switch-mode power converter that includes a current storage inductor and at least one power switching component coupled to receive line input voltage VLN and current ILN, and that provides a converted load output voltage VLD, comprising:
 a conduction control circuit for successively activating and deactivating the power switching component to effect successive conduction cycles such that during an activation period the inductor current through the current storage inductor increases from a reference inductor current and during a deactivation period the inductor current decreases to the reference inductor current;
 a piecewise-polynomial analog computer responsive to representations of the line voltage VLN and the load voltage VLD, and to a representation of power demand VCD corresponding to long term average power demand, for computing on-time periods for activating the power switching component to effect both power factor correction and peak current limiting operations in accordance with a piecewise-polynomial transfer function with at least two segments, a power-factor control transfer function segment and a current-limit control transfer function segment;
 for power factor correction operations, said piecewise-polynomial analog computer computes on-times according to the power-factor control transfer function based on the relationship between a power-factor corrected average current through the current storage inductor and the known representations for VLN, VLD, ad VCD, such that the operation of the power converter is power factor corrected;
 for peak current limiting operations, said piecewise-polynomial analog computer computes on-times according to the current-limit control transfer function based on the relationship between a predetermined peak current limit and the known representations for VLN and VLD, such that the operation of the power converter is peak current limited;
 a zero current detection circuit for determining when the inductor current is equal to zero, and providing a zero current detect signal to said conduction control circuit;
 said conduction control circuit being responsive to the zero current detect signal to activate the power switching component and initiate a conduction cycle, and being responsive to representations of the computed on-times and current limit on-times to deactivate the power switching component and terminate the conduction cycle.

37. The PFC controller of claim 36, wherein the power converter operates in buck mode, and wherein the power demand representation VCD is a voltage, and wherein said piecewise polynomial analog computer:
 computes on-times for power factor correction operations in accordance with the following relationships for the average current through the current storage inductor Iavg and the on-time for the power switching component ton:

$$Iavg = \frac{(VLN - VLD) \cdot VLD}{2 \cdot L \cdot VLN} \cdot ton$$

$$ton = \frac{VLN^2}{(VLN - VLD) \cdot VLD} \cdot VCD \cdot \alpha$$

where $\alpha$ is an constant of proportionality (with units of time/voltage); and
 computes current limit on-times for peak current limiting operations in accordance with the following relationship for the current limit on-time for the power switching component ton(limit):

$$ton(\text{limit}) = \frac{1}{VLN - VLD} \cdot L \cdot Ilimit$$

where L is effective inductance, and Ilimit is the predetermined peak current limit.

38. The PFC controller of claim 37, wherein the power converter includes at least two power switching components and selectably operates in either buck or buck-boost mode, and wherein, during buck-boost operations, the piecewise-polynomial analog computer:
 computes on-times in accordance with the following relationships for the average current through the current storage inductor Iavg and the on-time for the power switching component ton:

$$Iavg = \frac{VLN \cdot VLD}{2 \cdot L \cdot (VLN + VLD)} \cdot ton$$

$$ton = \frac{(VLN + VLD)}{VLD} \cdot VCD \cdot \alpha$$

where $\alpha$ is an constant of proportionality (with units of time/voltage); and
 computes current limiting on-times in accordance with the following relationship for the current limiting on-time for the power switching component ton(limit):

$$ton(\text{limit}) = \frac{1}{VLN} \cdot L \cdot Ilimit$$

where L is effective inductance and Ilimit is the predetermined peak current limit.

39. The PFC controller of claim 36, wherein said zero current detection circuit determines when a zero detect condition has occurred in which the rate of change of the inductor current (dIL/dt) is about zero, such that the inductor current need not be directly sensed.

40. The PFC controller of claim 39, wherein said zero current detection circuit includes an auxiliary winding of the current storage inductor, such that the zero detect condition is determined by comparing the current form said auxiliary winding with a reference.

41. The PFC controller of claim 39, further comprising a hiccup timer circuit for timing the period after deactivation of said power switching component, and if the zero detect condition is not detected for a hiccup time period, providing a time-out signal to said conduction control circuit to activate the power switching component, such that a conduction cycle is begun even if VLN and VLD are such that it is difficult to detect the zero detect condition.

42. The PFC controller of claim 41, wherein the hiccup time period is adjustable in direct relation to the magnitude of VLD.

43. The PFC controller of claim 36, wherein said conduction control circuit includes:
- a timing capacitor that, during each conduction cycle, is charged at a predetermined rate;
- a comparator for comparing the timing capacitor voltage with an on-time voltage Vton representative of the computed on-time or the computed current limiting on-time;
- such that when the timing capacitor voltage reaches the Vton threshold, said comparator deactivates the power switching component to terminate the conduction cycle; and
- discharge means for discharging the timing capacitor prior to the initiation of a conduction cycle.

44. The PFC controller of claim 43, wherein the power converter includes at least two power switching components, further comprising:
- a mode selection comparator for comparing a representation of the line input voltage VLN with a reference corresponding to a predetermined buck-/buck-boost threshold, and selecting buck mode operation when the magnitude of the line input voltage VLN is above the predetermined buck-/buck-boost threshold, and otherwise selecting buck-boost mode operation.

45. The PFC controller of claim 36, wherein the VLN, VLD, and VCD representations are respective current representations designated ILN, ILD, and ICD, and wherein said piecewise polynomial analog computer comprises:
- at least first and second translinear circuits respectively characterized by the power-factor control and current-limit control polynomial transfer function segments; and
- a clamping circuit for clamping the voltage of at least one internal node of said first translinear circuit to a virtual breakpoint voltage derived from said second translinear circuit;
- such that when said regulated node is at a voltage less than the virtual breakpoint voltage said first translinear circuit is active and the function generator implements the associated power-factor control transfer function segment, and when said regulated node is at a virtual voltage equal to the breakpoint voltage said second translinear circuit is active and the function generator implements the associated current-limit control transfer function segment.

46. The PFC control method of claim 45, wherein said clamping circuit comprises:
- a bipolar PNP transistor having its emitter coupled to said collector node, and its base coupled to said comparison node through which flows the collector current for a transistor in said second translinear circuit;
- such that when the voltage of the regulated node rises above the virtual breakpoint voltage, the corresponding voltage at the base of said bipolar transistor decreases, causing it to turn on and rob collector current said collector node, thereby causing a corresponding decrease in voltage at the regulated node;
- such that the voltage at said regulated node is regulated at the breakpoint voltage.

* * * * *

UNITED STATES PATENT AND TRADEMARK OFFICE
CERTIFICATE OF CORRECTION

PATENT NO. : 5,134,355
DATED : 07/28/92
INVENTOR(S) : Hastings, et al

It is certified that error appears in the above-indentified patent and that said Letters Patent is hereby corrected as shown below:

On the title page, Item [75]: add "Fredrick W. Trafton, Garland, Texas" as the second inventor.

Signed and Sealed this

Fourteenth Day of December, 1993

Attest:

BRUCE LEHMAN

*Attesting Officer*     *Commissioner of Patents and Trademarks*